United States Patent
Tsumiyama et al.

(10) Patent No.: US 9,815,412 B1
(45) Date of Patent: Nov. 14, 2017

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Takashi Hisamura, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/153,780

(22) Filed: May 13, 2016

(51) Int. Cl.
| | |
|---|---|
| *B60R 7/06* | (2006.01) |
| *B60R 21/13* | (2006.01) |
| *B62D 25/12* | (2006.01) |
| *B60J 1/00* | (2006.01) |
| *B60J 1/20* | (2006.01) |

(52) U.S. Cl.
CPC ............ *B60R 7/06* (2013.01); *B60J 1/006* (2013.01); *B60J 1/20* (2013.01); *B60R 21/13* (2013.01); *B62D 25/12* (2013.01)

(58) Field of Classification Search
CPC .................. B60R 7/06; B60R 21/13
USPC ....... 296/84.1, 78.1, 190.1, 96.18, 218, 224, 296/193.11, 37.1; 180/69.24
See application file for complete search history.

(56) References Cited

U.S. PATENT DOCUMENTS

| | | | | |
|---|---|---|---|---|
| 737,467 | A | * | 8/1903 | Pichl .................... B62D 25/10 180/69.24 |
| 1,668,682 | A | * | 5/1928 | Kohlberger ................ B60J 1/20 296/96.11 |
| 8,827,357 | B2 | | 9/2014 | Kaku et al. |
| 8,936,296 | B1 | * | 1/2015 | Fedders .................... B60J 1/06 296/190.1 |
| 8,960,754 | B1 | | 2/2015 | Maeda et al. |
| 9,061,711 | B2 | * | 6/2015 | Kuroda ................. B62D 25/10 |
| 2001/0007396 | A1 | * | 7/2001 | Mizuta ................... B62D 25/10 296/193.11 |
| 2013/0033070 | A1 | * | 2/2013 | Kinsman .............. B62D 21/183 296/190.03 |
| 2015/0259011 | A1 | * | 9/2015 | Deckard ............. B62D 21/183 280/781 |

* cited by examiner

*Primary Examiner* — Dennis H Pedder
(74) *Attorney, Agent, or Firm* — Wenderoth, Lind & Ponack, L.L.P.

(57) ABSTRACT

A utility vehicle has a riding space surrounded with a ROPS, a bonnet, and a windshield. The utility vehicle includes a storage box disposed in a bonnet chamber covered with the bonnet. The storage box includes a box body having an opened upper end, and a detachable box cover disposed substantially flush with the bonnet and covering, from above, the box body. The box cover has a front edge positioned behind a lower end of the windshield.

8 Claims, 13 Drawing Sheets

UPWARD

UTILITY VEHICLE

BACKGROUND OF THE INVENTION

Field of the Invention

The present invention relates to a utility vehicle, and particularly relates to a utility vehicle including a storage box disposed in a bonnet chamber.

Description of the Related Art

A utility vehicle has a riding space surrounded with a ROPS, a cargo bed disposed behind the riding space, and a bonnet disposed ahead of the riding space and covering the top of a bonnet chamber. The utility vehicle further includes, as necessary, a storage box protecting cargo from rain, dirt, and the like.

The storage box is installed at a different position depending on specifications of a utility vehicle, and will be installed below a seat, behind the seat, on a cargo bed, in a bonnet chamber, or the like. U.S. Pat. No. 8,827,357 is cited as a prior art literature on a utility vehicle. U.S. Pat. No. 8,960,754 discloses a utility vehicle including a storage box.

Figure 14:
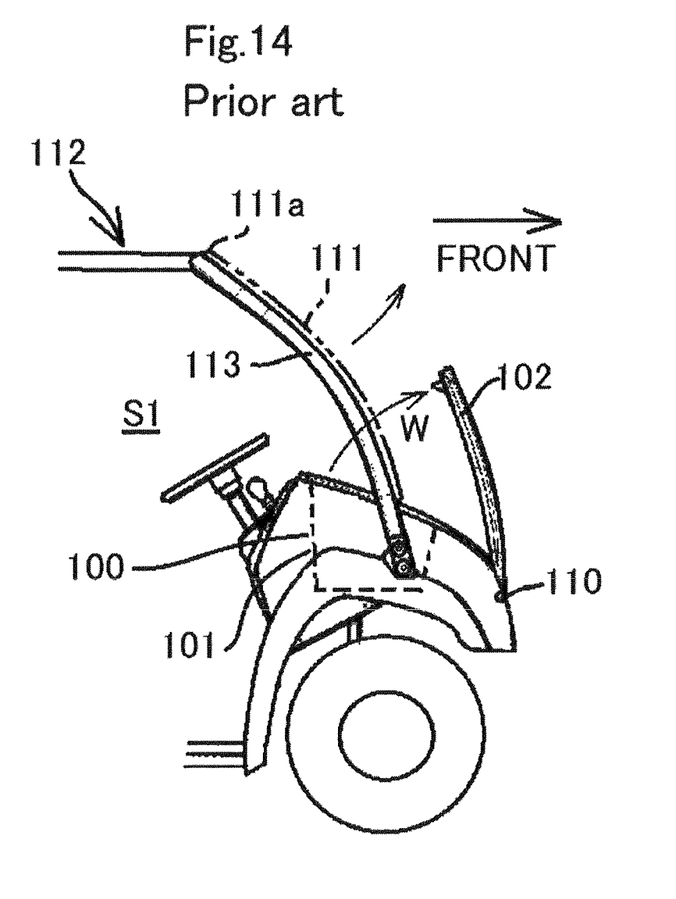
FIG. 14 is a side view of a front portion of a conventional utility vehicle.

FIG. 14 depicts a conventional utility vehicle including a bonnet chamber 100 provided therein with a storage box 101. The storage box 101 has a box cover (bonnet cover) 102 covering, from above, the storage box 101 and the bonnet chamber 100. The box cover 102 has a front end supported by a vehicle body frame or a bonnet via a hinge 110. When a rear end of the box cover 102 is lifted upward along an arrow W as indicated in the figure about the hinge 110 as a supporting point, the tops of the storage box 101 and the bonnet chamber 100 are opened.

Assume a case where a windshield 111 covering a front end of a riding space S1 is optionally provided along a front pillar 113 of a ROPS 112 as indicated by two-dot chain line. If the windshield 111 is of a fixed type, the windshield 111 interferes with the box cover 102 to inhibit the box cover 102 from being opened. In order to avoid such interference, the windshield 111 in the conventional utility vehicle is of a rotatable type configured to rotate forward and upward about an upper end 111a thereof as a supporting point, or is of a foldable type having two divided upper and lower members to allow the lower member to be opened upward.

The entirety or the lower portion of the windshield having the rotatable or foldable structure needs to be opened in order to open the box cover. This leads to troublesome access to the storage box. Furthermore, the structure of the windshield is complicated leading to increased cost for the windshield.

SUMMARY OF THE INVENTION

It is an object of the present invention to provide a utility vehicle including a windshield covering a front end of a riding space, in which a box cover is opened and closed or s attached and detached by access from the interior of the riding space, with no reduction in volume of a storage box in a bonnet chamber or no complication in structure of the windshield.

In order to achieve the object mentioned above, the present invention provides a utility vehicle provided with a ROPS surrounding a riding space, and a bonnet positioned ahead of the riding space, the ROPS having a lower front portion positioned substantially at a center in a vehicle anteroposterior direction of the bonnet, the utility vehicle including: a windshield positioned ahead of the ROPS, extending downward from an upper portion of the ROPS to the bonnet, and covering, from ahead, the riding space; and a storage box disposed in a bonnet chamber covered with the bonnet; in which the storage box includes a box body having an opened upper end, and a detachable box cover disposed substantially flush with the bonnet and covering, from above, the box body, and the box cover is positioned behind a lower end of the windshield.

The box cover of the storage box is located behind the windshield in the above configuration. The box cover is thus opened and closed or is attached or detached by access from the interior of the riding space, with no interference between the windshield and the box cover. Specifically, a driver or a crew has access to the interior of the storage box by opening or detaching the box cover with no need for rotating or detaching the windshield. Furthermore, the windshield is fixed in a simple manner, which prevents increase in cost for the windshield.

The utility vehicle preferably has any of the following configurations.

(a) The ROPS includes a pair of front pillars extending upward from respective ends in a vehicle width direction of the bonnet, and a front beam coupling upper ends of the front pillars, and the windshield has lateral ends in the vehicle width direction and an upper end supported by the front pillars and the front beam, respectively. The windshield is thus disposed easily at the front end of the riding space and is supported firmly.

(b) In the configuration (a), the windshield is detachably attached to the front pillars and the front beam by a plurality of clamps. The windshield is thus optionally attached to and detached from the ROPS easily.

(c) In the configuration (a), the box cover has a front edge positioned ahead of the lower front portion of the ROPS in a vehicle side view, and the lower end of the windshield has a convex shape projecting forward from the lower front portion of the front pillars of the ROPS in a planar view. The box cover is thus expanded forward in length. When the box cover is opened or detached, the top of the storage box is opened widely for easy access to the interior of the storage box.

(d) In the configuration (c), the front pillars each have a circular arc shape curving convexly upward and forward in a vehicle side view, and the windshield has an amount of projecting forward from the front pillars, the amount gradually increasing from the upper end to the lower end of the windshield. This configuration improves rigidity of the windshield as well as easily expands a space for the box cover.

(e) The utility vehicle further includes: a front fixing mechanism configured to fix a front end of the box cover to the bonnet or the box body; and a rear fixing mechanism configured to fix a rear end of the box cover to the bonnet or the box body; in which the front fixing mechanism includes an engagement concave portion provided at the bonnet or the box body, and an engagement projection provided to project forward at the front edge of the box cover and configured to be inserted from backward, or from upward and backward, to the engagement concave portion, and the rear fixing mechanism is a latch lock mechanism configured to manually lock and unlock. This configuration facilitates a task of detaching the box cover and achieves easy access to the interior of the storage box.

(f) The windshield includes a ventilation hole enabling ventilation between interior and exterior of the riding space, and a shutter configured to regulate an opening degree of the ventilation hole. This configuration easily brings the interior of the riding space into a ventilatable state with no need for opening or closing the windshield itself.

(g) In the configuration (f), the shutter is supported by the windshield slidably along a rear surface of the windshield. This configuration allows a driver or a crew staying in the riding space to easily operate the shutter for regulation of ventilation volume.

DETAILED DESCRIPTION OF THE INVENTION

FIGS. 1 to 13 each depict a utility vehicle according to the present invention. An exemplary embodiment of the present invention will now be described with reference to these figures. For easier description, assume that the utility vehicle travels "forward" with respect to the utility vehicle and respective components, and right and left sides in the vehicle width direction of a driver and a crew correspond to "right and left sides" of the utility vehicle and the respective components.

Figure 1:
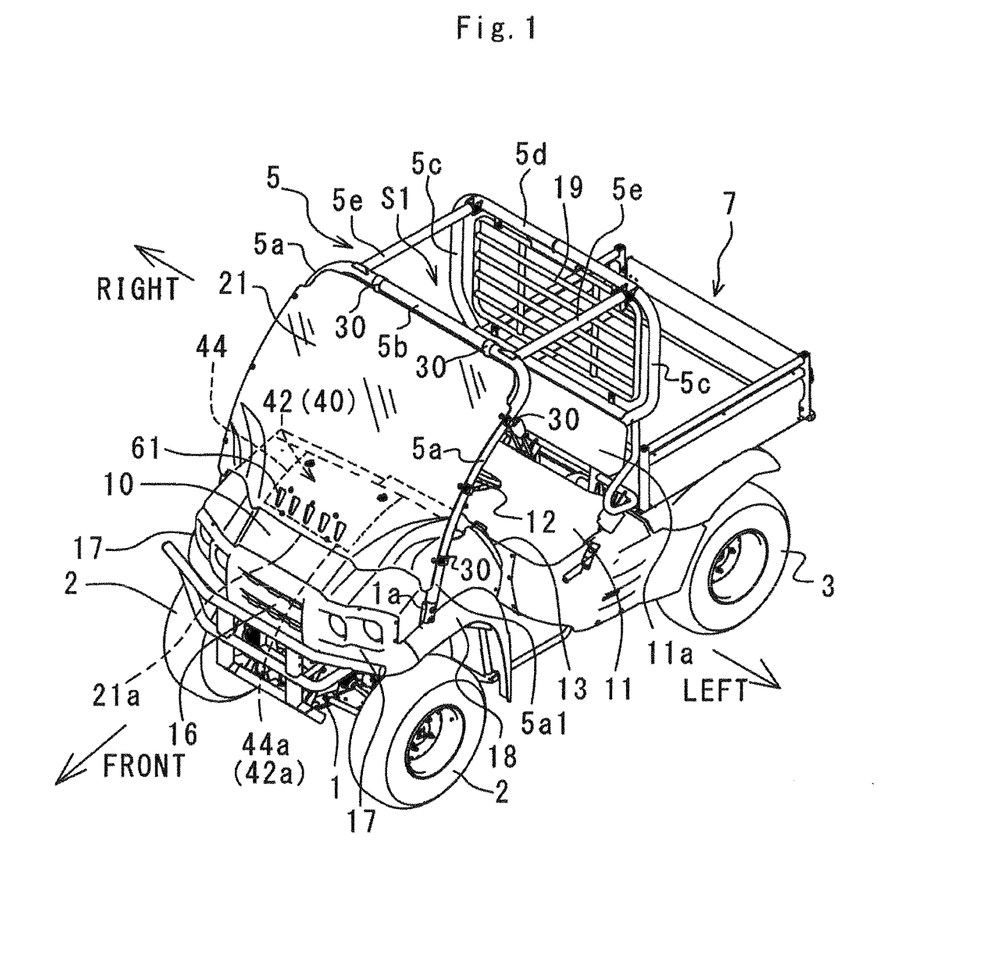
FIG. 1 is a schematic perspective view from an upper left front side, of a utility vehicle according to the present invention.

In FIG. 1, the utility vehicle includes a vehicle body frame 1, right and left front wheels 2 supported by a front end of the vehicle body frame 1, and right and left rear wheels 3 supported by a rear end of the vehicle body frame 1, a riding space (or a cabin) S1 surrounded with a ROPS 5, a cargo bed 7 disposed behind the riding space S1, and a bonnet 10 disposed ahead of the riding space S1. The riding space S1 accommodates a bench seat 11, and is provided, at its front end, with a steering wheel 12 and a dashboard 13. There is provided an engine (not depicted) from a space below the seat 11 to a space below a front portion of the cargo bed 7. The bonnet 10 is provided, at its front end, with a front grille 16 and right and left headlamp assemblies 17. The bonnet 10 is provided, below its right and left ends, with right and left front fenders 18 covering the tops and rear ends of right and left wheel housings. The ROPS 5 is provided, at its front end, with a windshield 21 covering the front end of the riding space S1 and made of transparent resin.

The ROPS is an abbreviation for a rollover protective structure. The ROPS 5 is made of round pipe members. The ROPS 5 includes right and left front pillars 5a, a front beam 5b coupling upper ends of the front pillars 5a, right and left rear pillars 5c, a rear beam 5d coupling upper ends of the rear pillars 5c, and right and left coupling beams 5e coupling ends in the vehicle width direction of the front beam 5b and ends in the vehicle width direction of the rear beam 5d. The right and left front pillars 5a and the front beam 5b are formed integrally into an inverted U shape by bending a single round pipe member. Similarly, the right and left rear pillars 5c and the rear beam 5d are formed integrally into an inverted U shape by bending a single round pipe member. The right and left coupling beams 5e extend in the anteroposterior direction and are coupled to the front beam 5b and the rear beam 5d by welding or the like.

The right and left front pillars 5a extend upward and backward from lateral ends (right and left ends) in the vehicle width direction of the bonnet 10. Lowermost ends of the right and left front pillars 5a are firmly fixed to right and left supports 1a provided at the vehicle body frame 1 by bolts or the like. The rear pillars 5c are positioned between a backrest 11a of the seat 11 and a front wall of the cargo bed 7 in a vehicle side view. The rear pillars 5c are provided therebetween with a metal screen 19 having a lattice shape.

The windshield 21 has lateral ends in the vehicle width direction and an upper end detachably attached to the right and left front pillars 5a and the front beam 5b by a plurality of clamps 30.

Figure 6:
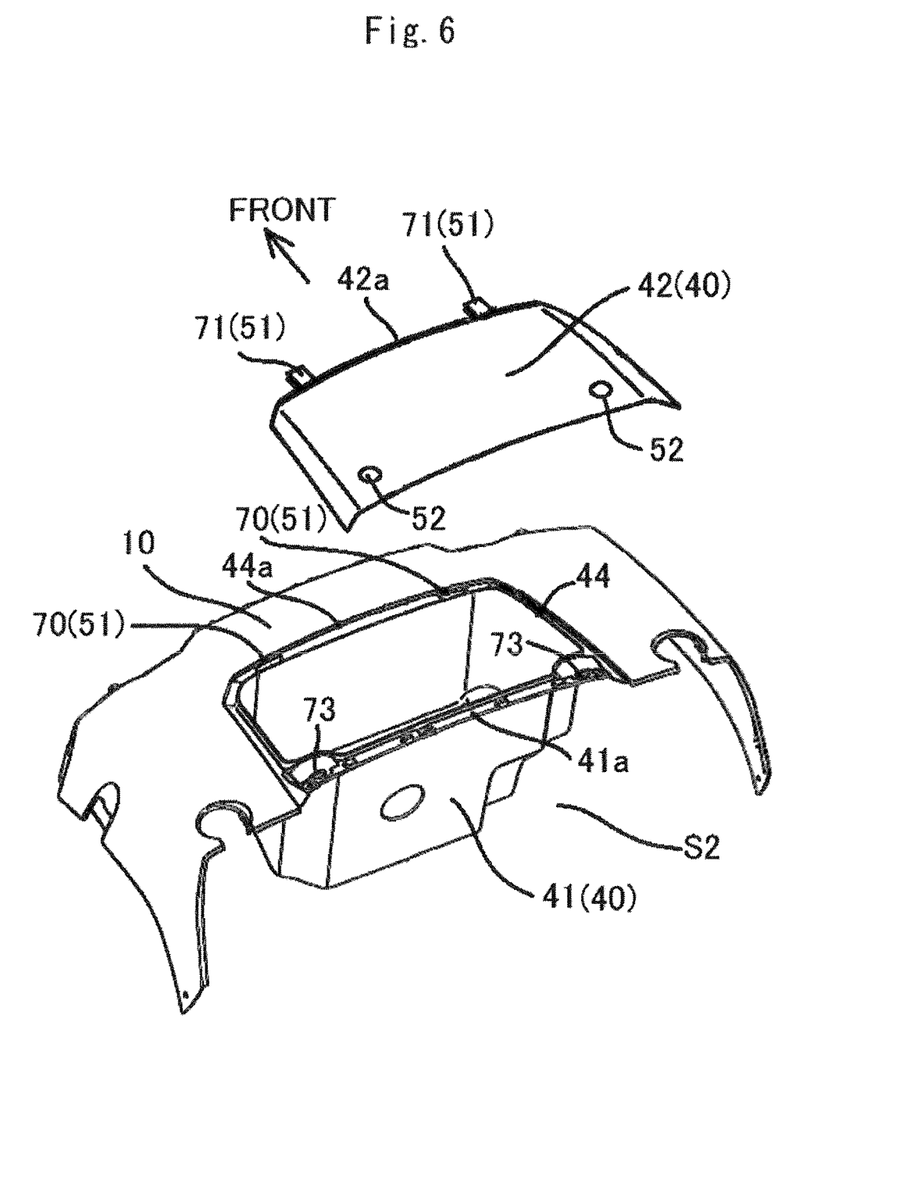
FIG. 6 is a perspective view from an upper left rear side, of a bonnet and the box cover depicted in FIG. 1.

In FIG. 6, the bonnet 10 covers the top and lateral ends in the vehicle width direction of a bonnet chamber S2, and the bonnet chamber S2 accommodates a storage box 40. The storage box 40 includes a box body 41 having a substantially rectangular parallelepiped shape with an opened upper end, and a box cover 42 covering a head opening of the box body 41. The box body 41 is accommodated in the bonnet chamber S2, and the upper end of the box body 41 is fixed to a rear surface (lower surface) of the bonnet 10 by a fastener member such as a bolt or a rivet. The box cover 42 has a rectangular planar shape substantially corresponding to the shape of an upper end surface of the box body 41. The bonnet 10 has a rectangular opening 44 substantially corresponding to the planar shape of the box cover 42, and the opening 44 has a rear end opened backward at the rear end of the bonnet 10. The opening 44 has a front end 44a positioned behind the front end of the bonnet 10 by a certain distance. The box cover 42 is fitted in the opening 44 of the bonnet 10 so as to cover the top of the box body 41, and is fixed to the bonnet 10 or the box body 41 by a pair of front fixing mechanisms 51 and a pair of rear fixing mechanisms 52.

Figure 4:
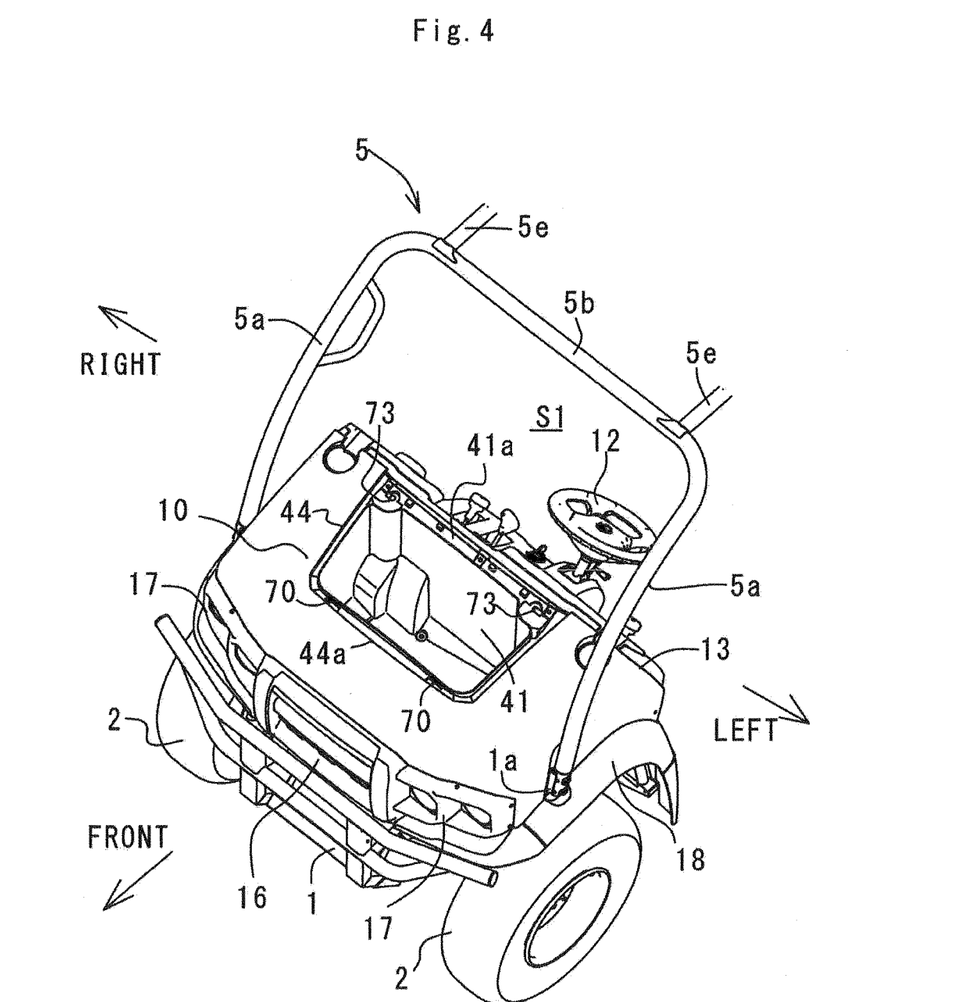
FIG. 4 is a perspective view from an upper left front side, of the front portion of the utility vehicle with the box cover and a windshield depicted in FIG. 1 being detached.

In FIG. 4, the opening 44 of the bonnet 10 is positioned substantially at the center in the vehicle width direction of the bonnet 10, and has a width in the vehicle width direction, which is about a half to one third of the entire length in the vehicle width direction of the bonnet 10. The rear end of the opening 44 is surrounded, from behind, with the upper end of the dashboard 13.

Figure 2:
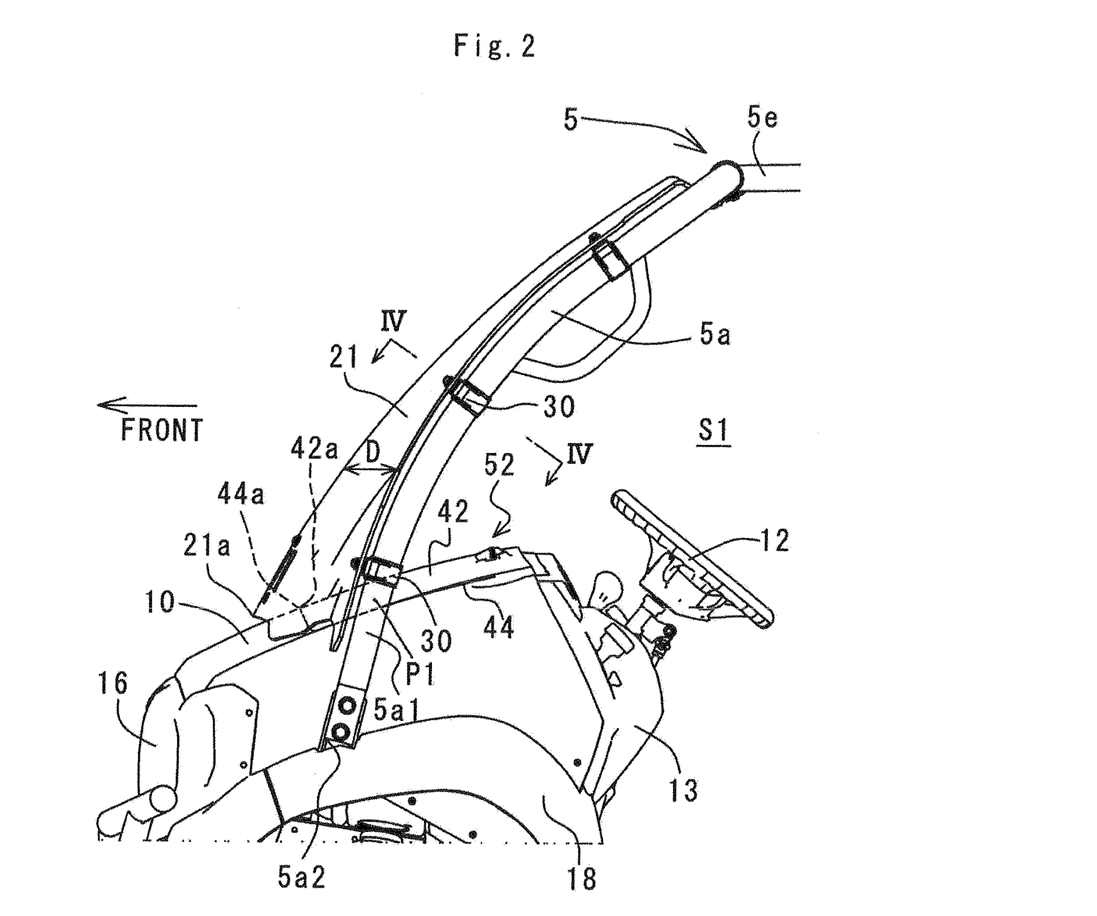
FIG. 2 is a left side view of a front portion of the utility vehicle depicted in FIG. 1.

In FIG. 2, the right and left front pillars 5a have lower front portions 5a1 of the ROPS 5, which are positioned substantially at the center in the vehicle anteroposterior direction of the bonnet 10 in a vehicle side view. The front pillars 5a each have a moderate circular arc shape curving convexly upward and forward and has the upper end reaching a position above the steering wheel 12 in a vehicle side view.

The front end 44a of the opening 44 of the bonnet 10 is positioned ahead of an intersection point P1 between the lower front portion Sal of the front pillar 5a and an upper surface of the bonnet 10 in a vehicle side view. Furthermore, the front end 44a of the opening 44 according to the present embodiment is positioned ahead of a frontmost end 5a2 of the lower front portion 5a1. In the state where the box cover 42 is fitted in the opening 44, the box cover 42 has a front edge 42a that is also positioned ahead of the intersection point P1 on the lower front portion 5a1 of the front pillar 5a and is positioned ahead of the frontmost end 5a2 of the front pillar 5a.

The lateral ends in the vehicle width direction of the windshield 21 are attached to the right and left front pillars 5a as described above. The windshield 21 has an intermediate portion in the vehicle width direction bulging horizontally forward from the lateral ends in the vehicle width direction. The windshield 21 bulges horizontally forward from the front pillars 5a by an amount D gradually increasing from the upper end of the windshield 21 toward the lower end. The bulging amount D is the maximum at a lower end 21a of the windshield 21 that is positioned ahead of at least the front end 44a of the opening 44 of the bonnet 10 and the front edge 42a of the box cover 42 in a vehicle side view. In other words, the front end 44a of the opening 44 and the front edge 42a of the box cover 42 are positioned behind the lower end 21a of the windshield 21 in a vehicle side view. The windshield 21 also has a circular arc shape moderately curving convexly upward and forward in a vehicle side view. The windshield 21 has a three-dimensional shape with the intermediate portion in the vehicle width direction bulging forward and with the curve convexly upward and forward in a side view. The windshield 21 is formed by assembling a plurality of separately prepared members or by shaping integrally as a single member.

A ventilation mechanism of the windshield 21 will be described with reference to FIGS. 1 and 7. In FIG. 1, the windshield 21 is provided, at a lower portion, with a plurality of ventilation holes 61 enabling ventilatable communication between the interior and the exterior of the riding space S1, in other words, between spaces ahead of and behind the windshield 21. The ventilation holes 61 each have an inverted triangle shape and are aligned at equal intervals in the vehicle width direction. The number of the ventilation holes 61 is five, for example.

Figure 7:
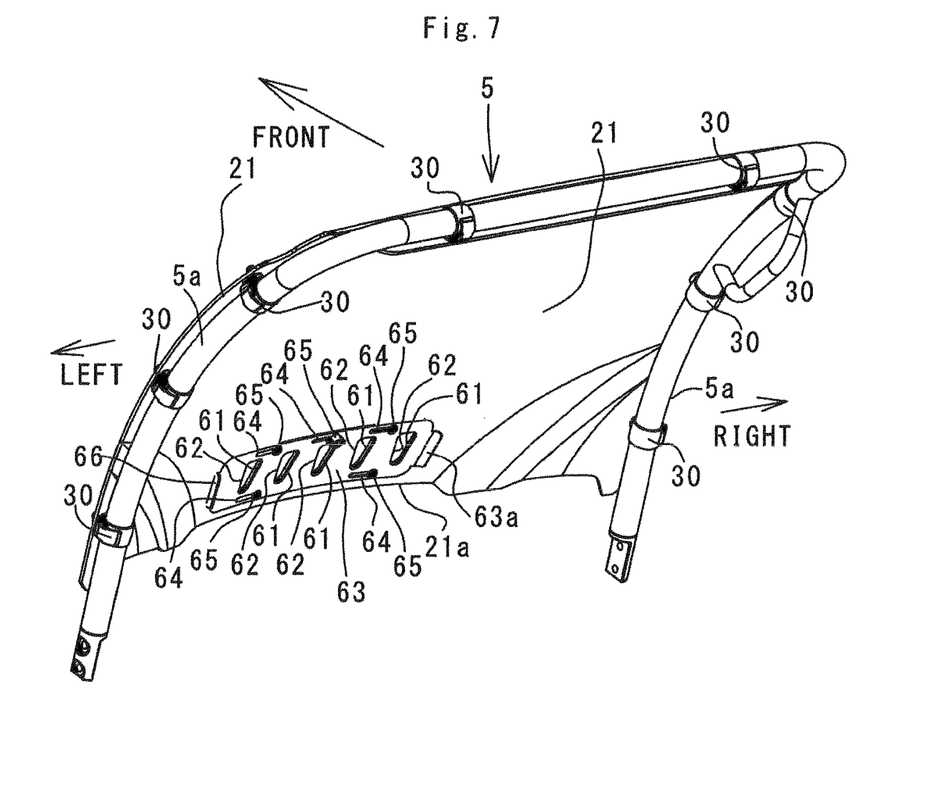
FIG. 7 is a perspective view from an upper left rear side, of the windshield and a front portion of a ROPS depicted in FIG. 1.

In FIG. 7, the rear surface (back surface) of the windshield 21 supports a shutter 63 having a plurality of regulation holes 62 slidably in the vehicle width direction. The regulation holes 62 each have the inverted triangle shape same as those of the ventilation holes 61. The number of the regulation holes 62 is five, and the five regulation holes 62 are aligned at equal intervals in the vehicle width direction, similarly to the ventilation holes 61.

The shutter 63 has a rectangular shape elongated in the vehicle width direction, and has upper and lower portions provided with guide holes 64 guiding the shutter 63 shiftably in the vehicle width direction and limiting an amount of the shift. Each of the guide holes 64 is elongated in the vehicle width direction, and engages with a guide pin 65 provided on the windshield 21. In a state where the ventilation holes 61 are fully opened (as depicted in FIG. 7), the left end of the shutter 63 is in contact with a stopper 66 provided on the windshield 21. The shutter 63 is provided, at its right end, with a tab 63a. When the tab 63a is pinched and the shutter 63 is slid rightward from the fully opened state depicted in FIG. 7, the ventilation holes 61 have gradually decreasing opening degrees. When left edges of the guide holes 64 come in contact with the guide pins 65, respectively, the shutter 63 is stopped and the ventilation holes 61 are completely closed.

The clamps 30 configured to fix the windshield 21 will be described in detail with reference to FIGS. 7 to 9. In FIG. 7, the left end of the windshield 21 is detachably attached to the left front pillar 5a by three of the clamps 30. The right end of the windshield 21 is detachably attached to the right front pillar 5a by three of the clamps 30. The upper end of the windshield 21 is detachably attached to the front beam 5b by two of the clamps 30. All the clamps 30 are structured identically, and detailed description will refer only to the structure of the clamps 30 attached to the left front pillar 5a.

Figure 8:
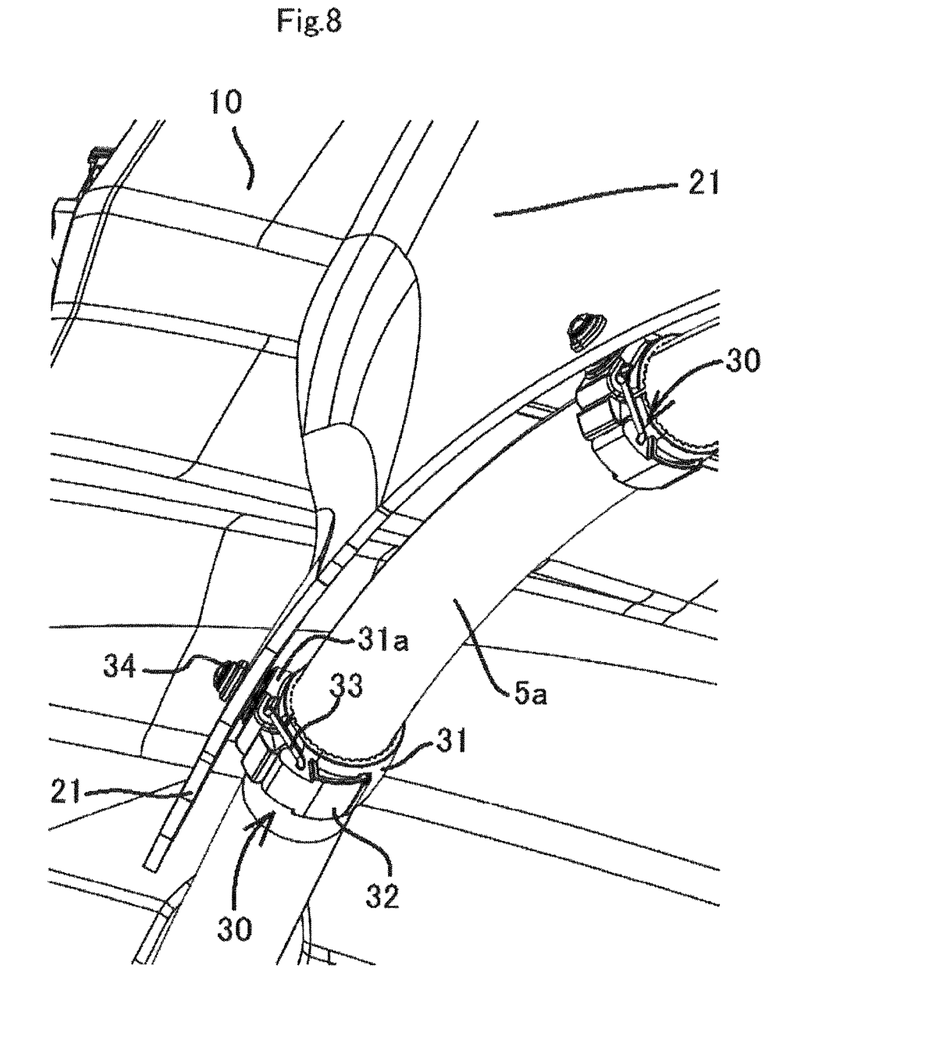
FIG. 8 is an enlarged perspective view from an upper left rear side, of a portion where the windshield depicted in FIG. 1 is attached to a front pillar by clamps.

In FIG. 8, the clamps 30 each include a clamp body 31 that has flexibility and a C or U shape with a variable diameter, a circular arc lever 32 manipulated to reduce the diameter of the clamp body 31, and a coupling ring 33 having a substantially rectangular shape and configured to couple the lever 32 and a first circumferential end of the clamp body 31. The clamp body 31 has a shield attachment seat 31d configured to attach the windshield 21.

Figure 9:
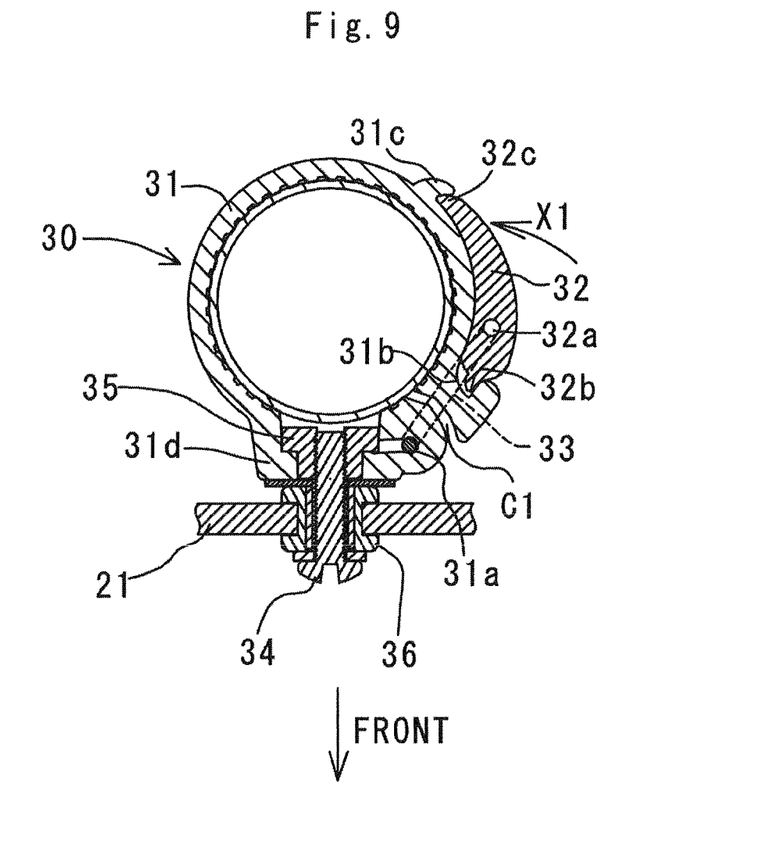
FIG. 9 is an enlarged sectional view of the clamp taken along line IX-IX indicated in FIG. 2.

In FIG. 9, the windshield 21 is attached to the shield attachment seat 31d by a bolt 34, a nut 35, a grommet 36 made of an elastic material, and the like. The coupling ring 33 has a first circumferential end rotatably coupled to a coupling hole 31a provided at the first circumferential end of the clamp body 31. The coupling ring 33 has a second circumferential end rotatably coupled to a coupling hole 32a provided at a circumferentially halfway portion of the lever 32. The first circumferential end and a second circumferential end of the clamp body 31 circumferentially face each other with a dividing space C1. The second circumferential end is provided with a pivot concave portion 31b. The pivot concave portion 31b receives a pivot convex portion 32b provided at a circumferential proximal end of the lever 32 so as to support the pivot convex portion 32b. The clamp body 31 is provided, on an outer circumferential surface at a position circumferentially distant from the pivot concave portion 31b by a certain distance, with a hook 31c holding a distal end 32c of the lever 32 when the clamp body 31 is fastened.

In a case where the clamp 30 is attached to the front pillar 5a, the lever 32 is initially disengaged from the pivot concave portion 31b and the hook 31c of the clamp body 31, the dividing space C1 of the clamp body 31 is enlarged, and the clamp 30 is fitted around an outer circumferential surface of the front pillar 5a. The pivot convex portion 32b of the lever 32 is subsequently inserted to the pivot concave portion 31b of the clamp body 31, and the lever 32 is rotated along an arrow X1 about a point of contact between an inner circumferential surface of the pivot concave portion 31b and the pivot convex portion 32b as a rotation supporting point. The circumferential ends of the clamp body 31 come closer with each other with the coupling ring 33 being interposed therebetween to reduce the dividing space C1 and reduce the diameter of the clamp body 31, and the clamp body 31 is firmly fastened to the outer peripheral surface of the front pillar 5a. The distal end 32c of the lever 32 is finally engaged with the hook 31c of the clamp body 31. The clamp 30 is thus made to keep clamping the front pillar 5a. The attaching tasks described above will be performed in the reverse order to detach the clamp 30 from the front pillar 5a.

Figure 10:
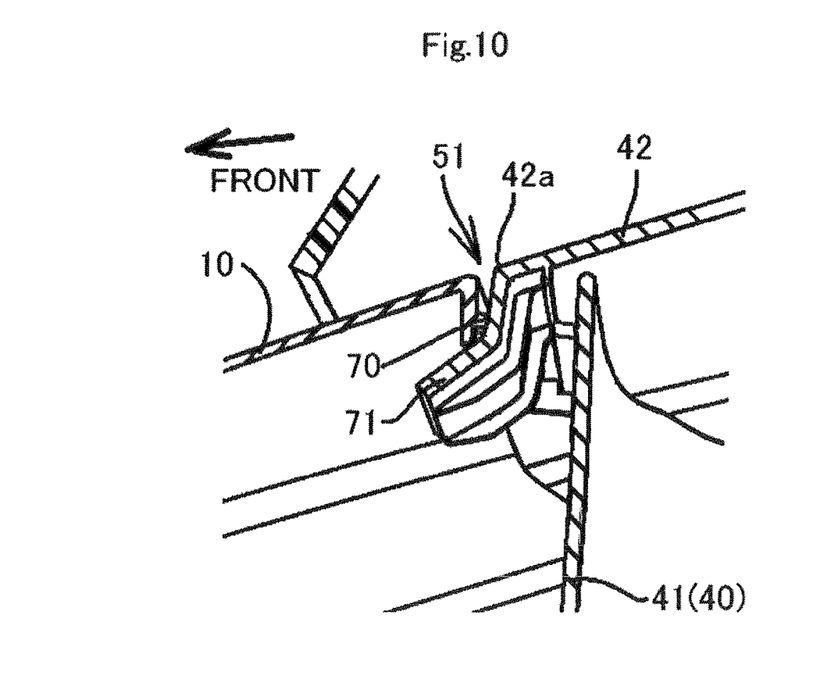
FIG. 10 is an enlarged perspective view of a vertical section of a front fixing mechanism for the box cover depicted in FIG. 1.

How the box cover 42 is fixed will be described in detail with reference to FIGS. 4 to 6 and 11 to 13. In FIG. 6, the front end 44a of the opening 44 of the bonnet 10 is provided with right and left engagement holes (corresponding to engagement concave portions) 70, and the front edge 42a of the box cover 42 is provided with right and left engagement projections 71 projecting forward. In FIG. 10, the engagement projections 71 each have an L shape in a side view, and the engagement projection 71 and the engagement hole 70 of the bonnet 10 form the front fixing mechanism 51 configured to fix the front end of the box cover 42. When the engagement projections 71 are inserted to the engagement holes 70 from backward, or from upward and backward, the front edge 42a of the box cover 42 is fixed to (engaged with) or is rotatably supported by the bonnet 10.

Figure 5:
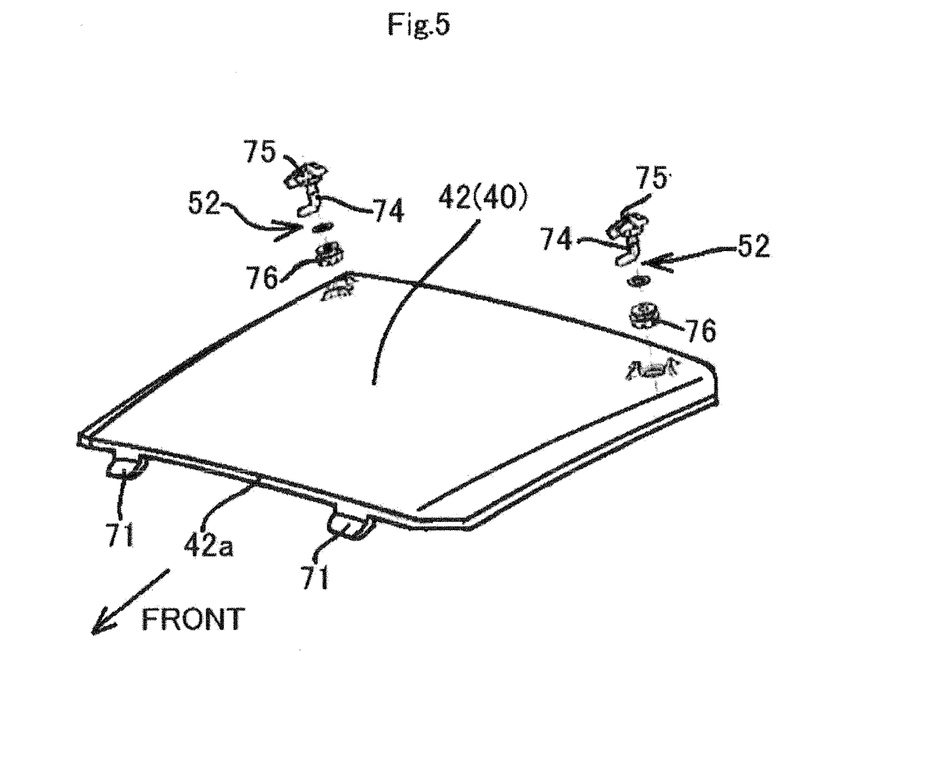
FIG. 5 is a perspective view from an upper left front side, of the box cover depicted in FIG. 1.

In FIG. 4, the box body 41 is provided, at its upper rear end, with a box cover support 41a having right and left long holes 73. In FIG. 5, the box cover 42 is provided, at its right and left rear ends, lock pins 74 each having an L shape. The lock pins 74, the long holes 73 (FIG. 4), and the like configure latch lock mechanisms. The latch lock mechanisms are provided as the rear fixing mechanisms 52. The rear end of the box cover 42 is locked and unlocked by manually operating the lock pins 74.

Figure 11:
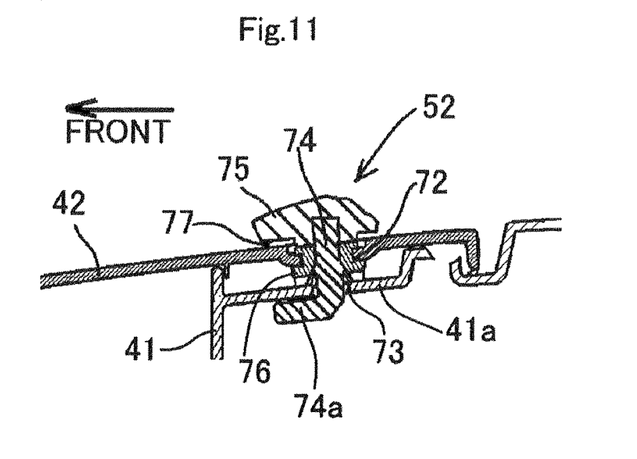
FIG. 11 is an enlarged perspective view of a vertical section of a rear fixing mechanism for the box cover depicted in FIG. 1.

Specifically with regard to the structure of the rear fixing mechanisms 52, in FIG. 11, the rear fixing mechanisms 52 each include the lock pin 74 and the long hole 73, as well as a grommet 76 fitted to a pin support hole 72 provided at the box cover 42, and a knob 75 firmly fixed to an upper end of the lock pin 74 that is rotatably fitted to an inner circumferential surface of the grommet 76.

Figure 13:
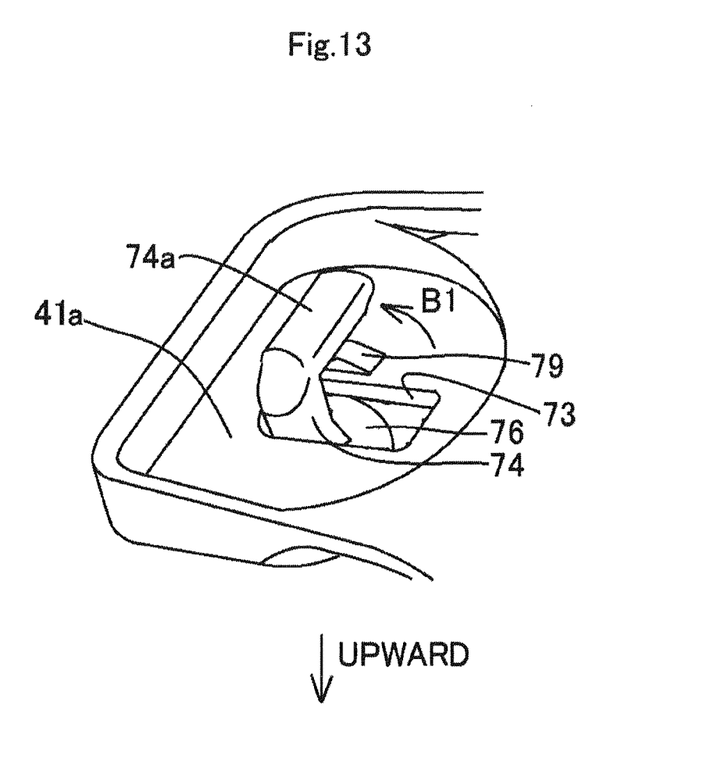
FIG. 13 is a lower perspective view of the rear fixing mechanism depicted in FIG. 11.

In FIG. 13, the lock pin 74 is integrally provided, at its lower end, with an engagement portion 74a that is bent substantially vertically. The engagement portion 74a is configured to vertically penetrate the long hole 73 along an extending direction of the long hole 73 of the box cover support 41a. The box cover support 41a is provided, on its lower surface, with a reverse rotation preventing projection 79 configured to hold the engagement portion 74a of the lock pin 74 at a lock position. The reverse rotation preventing projection 79 has a gentle cone shape projecting downward. The engagement portion 74a is configured to cross over the reverse rotation preventing projection 79 in a lock direction B1 or in the opposite direction against elastic force of the grommet 76. After the engagement portion 74a crosses over the reverse rotation preventing projection 79 in the lock direction B1, the reverse rotation preventing projection 79 prevents the engagement portion 74a from rotating in the opposite direction to the lock direction B1 and keeps the engagement portion 74a at the lock position.

Figure 12:
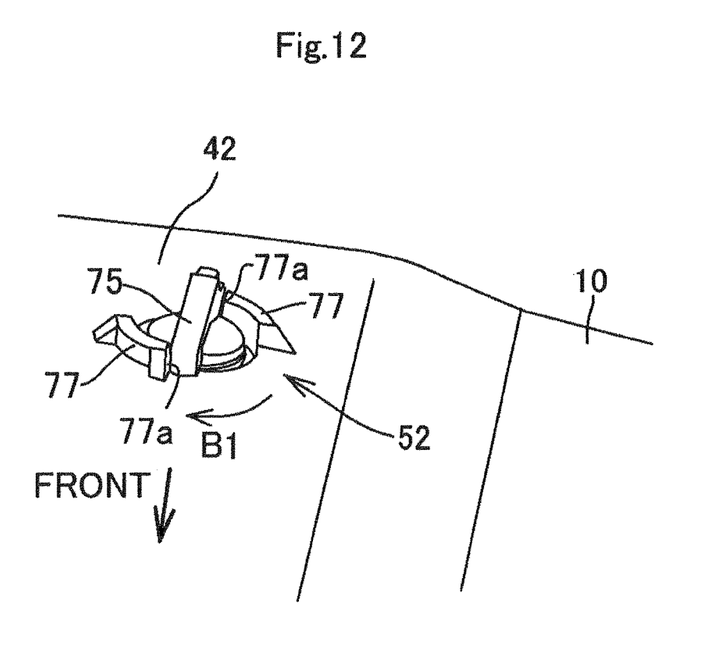
FIG. 12 is a perspective view from an upper front side, of the rear fixing mechanism depicted in FIG. 11.

In FIG. 12, the box cover 42 is provided, on its upper surface, with a pair of projections 77 configured to restrict, at the lock position, the knob 75 rotating in the lock direction B1. The projections 77 project upward from the upper surface of the box cover 42 and each have a circular arc shape surrounding the lock pin 74 when viewed from above. The projections 77 each have a circumferential end serving as a stopper surface 77a. When the knob 75 rotating in the lock direction B1 comes into contact with the stopper surfaces 77a, the knob 75 is locked at the lock position.

Figure 3:
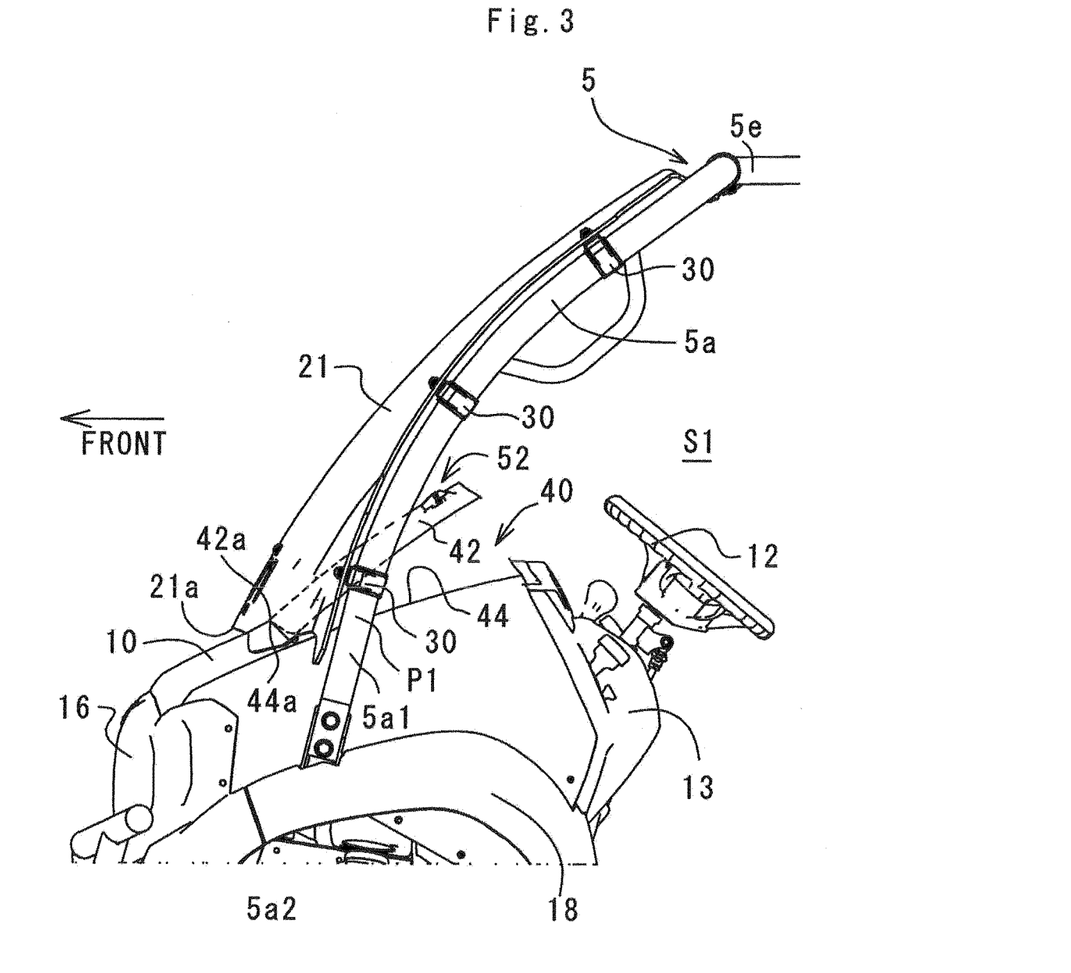
FIG. 3 is a left side view, similar to FIG. 2, of the front portion of the utility vehicle with a box cover being opened.

In order to attach the box cover 42, as depicted in FIG. 3, an operator in the riding space S1 initially shifts the box cover 42 to above the opening 44 of the bonnet 10 and engages the front edge 42a of the box cover 42 with the bonnet 10. Specifically, as depicted in FIG. 10, the engagement projections 71 at the front edge 42a of the box cover 42 are inserted from upward and backward to the engagement holes 70 of the bonnet 10.

In FIG. 11, the engagement portion 74a of the lock pin 74 is subsequently directed along the long hole 73. The rear end of the box cover 42 is placed on the box cover support 41a of the box body 41 and the engagement portion 74a is inserted to the long hole 73. The operator grips the knob 75 and rotates the lock pin 74 about its pin axis in the lock direction B1 (FIG. 12). The rear end of the box cover 42 is thus locked.

The attaching tasks described above will be performed in the reverse order to detach the box cover 42. Specifically, in FIG. 11, the operator grips the knob 75 and rotates the lock pin 74 to an original unlock position so as to allow the engagement portion 74a to be extracted from the long hole 73. In other words, the rear end of the box cover 42 is released from the locking by the rear fixing mechanism 52. As depicted in FIG. 3, the rear end of the box cover 42 is then lifted upward to be detached upward and backward. The upper end of the box body 41 of the storage box 40 is thus fully opened.

Even when the rear end of the box cover 42 is lifted upward about the front edge 42a of the box cover 42 as a rotation supporting point (the state depicted in FIG. 3) without detaching the box cover 42, the operator has easy access, from backward, to the interior of the storage box 40.

The utility vehicle according to the embodiment described above achieves the following advantages.

(a) The front edge 42a of the box cover 42 of the storage box 40 is positioned behind the lower end 21a of the windshield 21. The box cover 42 is thus opened and closed or is attached or detached easily by access from the interior of the riding space S1, with no interference between the windshield 21 and the box cover 42. Specifically, a driver or a crew staying in the riding space S1 has access to the interior of the storage box 40 by opening or detaching the box cover 42 with no need for rotating or detaching the windshield 21.

(b) The windshield 21 is entirely fixed to the front pillars 5a and the front beam 5b of the ROPS 5. The windshield 21 is not complicated in structure and inhibits increase in cost therefor. The windshield 21 is disposed easily at the front end of the riding space S1 and is supported firmly.

(c) The windshield 21 is detachably attached to the front pillars 5a and the front beam 5b by the plurality of clamps 30. This configuration thus allows a user to optionally attach and detach the windshield 21 easily to and from the ROPS 5.

(d) The front edge 42a of the box cover 42 is positioned ahead of the lower front portions 5a1 of the front pillars 5a of the ROPS 5, at least ahead of the intersection points P1 indicated in FIG. 2 in a vehicle side view. The lower end 21a of the windshield 21 has the convex shape projecting forward from the lower front portions 5a1 of the right and left front pillars 5a in a planar view. The box cover 42 is thus expanded forward in size. When the box cover 42 is opened or detached, the top of the storage box 40 is opened largely for easy access to the interior of the storage box 40.

(e) The front pillars 5a each have the circular arc shape curving convexly upward and forward in a vehicle side view. The windshield 21 has the forward bulging amount D from the front pillars 5a gradually increasing from the upper end to the lower end of the windshield 21. This configuration improves rigidity of the windshield 21 as well as expands the space for the box cover 42 in the riding space S1.

(f) There are provided the front fixing mechanisms 51 and the rear fixing mechanisms 52 configured to fix the box cover 42. The front fixing mechanisms 51 each include the engagement hole (engagement concave portion) 70 provided at the bonnet 10 and the engagement projection 71 formed to project forward at the front edge 42a of the box cover 42. The rear fixing mechanisms 52 are each provided as the latch lock mechanism including the lock pin 74 in the L shape and configured to lock or unlock by manual operation. This configuration facilitates the task of detaching the box cover 42 by the single operation of rotating the lock pin 74.

(g) The windshield 21 is provided at the lower portion with the plurality of ventilation holes 61 enabling ventilation between the interior and the exterior of the riding space S1, and the shutter 63 configured to regulate the opening degrees of the ventilation holes 61. This configuration allows a driver or a crew to easily bring the interior of the riding space S1 into a ventilated state without opening or closing the windshield 21 itself.

(h) The shutter 63 configured to open and close the ventilation holes 61 is supported by the windshield 21 slidably along the rear surface of the windshield 21. This configuration allows a driver or a crew staying in the riding space S1 to slide the shutter 63 in order to regulate ventilation volume.

[Other Embodiments]

(1) The box cover according to the embodiment described above is configured to be easily detachable. The front fixing mechanisms each including the engagement projection and the engagement hole (engagement concave portion) are optionally replaced with a structure in which the front end of the box cover is rotatably supported by the bonnet or the like via a hinge portion so as to allow the box cover to rotate about the hinge portion but inhibit the box cover from being detached easily.

(2) Either the bonnet or the box body will serve as a target member of fixing the front end and the rear end of the box cover by means of the front fixing mechanisms and the rear fixing mechanisms. For example, both of the front end and the rear end of the box cover are detachably attached to the bonnet or to the box body.

(3) The present invention is applicable to a utility vehicle having front and rear two seat rows. The present invention is also applicable to a utility vehicle provided with a windshield covering a front end of a riding space as well as cabin walls covering a rear end, right and left lateral ends, and an upper end of the riding space.

(4) The present invention is not limited to the configurations according to the embodiments described above, but possibly includes various modification examples devisable within the range not departing from the features recited in the following claims.

What is claimed is:

1. A utility vehicle provided with a ROPS surrounding a riding space, and a bonnet positioned ahead of the riding space, the ROPS having a lower front portion positioned substantially at a center in a vehicle anteroposterior direction of the bonnet, the utility vehicle comprising:
a windshield positioned ahead of the ROPS, extending downward from an upper portion of the ROPS to the bonnet, and covering, from ahead, the riding space; and
a storage box disposed in a bonnet chamber covered with the bonnet; wherein
the storage box includes a box body having an open upper end, and a detachable box cover disposed substantially flush with the bonnet and covering, from above, the box body, and
the entire box cover is positioned behind a lower end of the windshield.

2. The utility vehicle according to claim 1, wherein
the ROPS includes a pair of front pillars extending upward from respective ends in a vehicle width direction of the bonnet, and a front beam coupling upper ends of the front pillars, and
the windshield has lateral ends in the vehicle width direction and an upper end supported by the front pillars and the front beam, respectively.

3. The utility vehicle according to claim 2, wherein the windshield is detachably attached to the front pillars and the front beam by a plurality of clamps.

4. The utility vehicle according to claim 1, further comprising:
a front fixing mechanism configured to fix a front end of the box cover to the bonnet and the box body; and
a rear fixing mechanism configured to fix a rear end of the box cover to the bonnet and the box body; wherein
the front fixing mechanism includes an engagement concave portion provided at the bonnet, and an engagement projection provided to project forward at the front edge of the box cover and configured to be inserted from backward, or from upward and backward, to the engagement concave portion, and
the rear fixing mechanism is a latch lock mechanism configured to manually lock and unlock.

5. The utility vehicle according to claim 1, wherein the windshield includes a ventilation hole enabling ventilation between interior and exterior of the riding space, and a shutter configured to regulate an opening degree of the ventilation hole.

6. The utility vehicle according to claim 5, wherein the shutter is supported by the windshield slidably along a rear surface of the windshield.

7. A utility vehicle provided with a ROPS surrounding a riding space, and a bonnet positioned ahead of the riding space, the ROPS having a lower front portion positioned substantially at a center in a vehicle anteroposterior direction of the bonnet, the utility vehicle comprising:
a windshield positioned ahead of the ROPS, extending downward from an upper portion of the ROPS to the bonnet, and covering, from ahead, the riding space; and
a storage box disposed in a bonnet chamber covered with the bonnet;
wherein the storage box includes a box body having an open upper end,
and a detachable box cover disposed substantially flush with the bonnet and covering, from above, the box body, and the box cover is positioned behind a lower end of the windshield,
wherein the ROPS includes a pair of front pillars extending upward from respective ends in a vehicle width direction of the bonnet, and a front beam coupling upper ends of the front pillars, and the windshield has lateral ends in the vehicle width direction and an upper end supported by the front pillars and the front beam, respectively, and
wherein the box cover has a front edge positioned ahead of the lower front portion of the ROPS in a vehicle side view, and the lower end of the windshield has a convex shape projecting forward from the lower front portion of the front pillars of the ROPS in a planar view.

8. The utility vehicle according to claim 7, wherein the front pillars each have a circular arc shape curving convexly upward and forward in a vehicle side view, and the windshield projects forwardly by an amount from the front pillars, the amount gradually increasing from the upper end to the lower end of the windshield.

\* \* \* \* \*